(No Model.) 3 Sheets—Sheet 1.

G. MILES.
CONVEYING APPARATUS.

No. 562,967. Patented June 30, 1896.

Witnesses
Jas. J. Maloney.
J. P. Livermore

Inventor,
George Miles,
by Jos. P. Livermore
Att'y.

ANDREW B.GRAHAM. PHOTO-LITHO WASHINGTON.D.C.

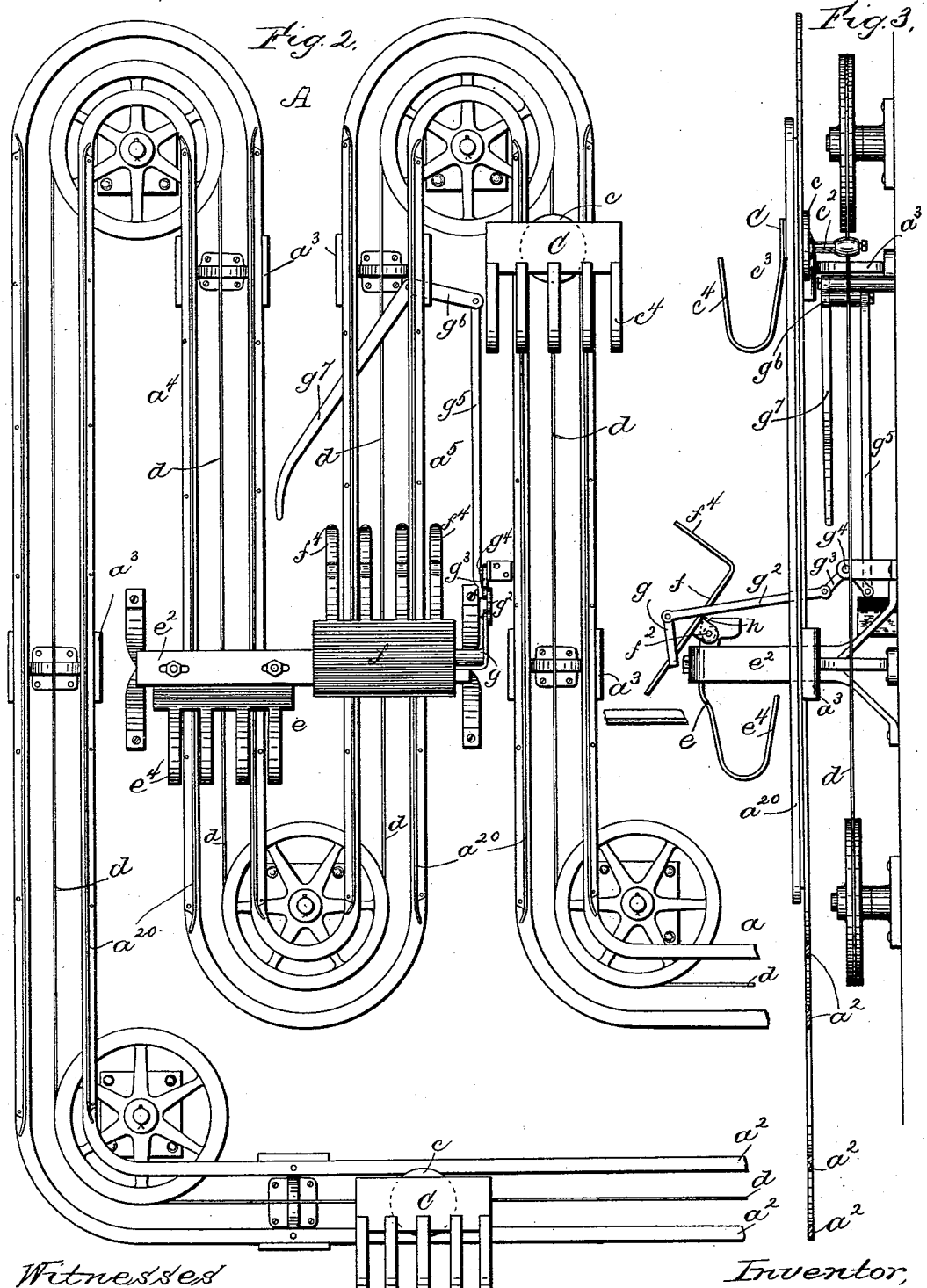

(No Model.) 3 Sheets—Sheet 3.

G. MILES.
CONVEYING APPARATUS.

No. 562,967. Patented June 30, 1896.

Witnesses
Jas. J. Maloney
H. Livermore

Inventor,
George Miles.
by Jno. P. Livermore
Att'y.

UNITED STATES PATENT OFFICE.

GEORGE MILES, OF WELLESLEY, MASSACHUSETTS.

CONVEYING APPARATUS.

SPECIFICATION forming part of Letters Patent No. 562,967, dated June 30, 1896.

Application filed March 27, 1895. Serial No. 543,361. (No model.)

*To all whom it may concern:*

Be it known that I, GEORGE MILES, of Wellesley Hills, county of Norfolk, State of Massachusetts, have invented an Improvement in Conveying Apparatus, of which the following description, in connection with the accompanying drawings, is a specification, like letters on the drawings representing like parts.

My invention relates to a conveying apparatus adapted to convey parcels or small articles from point to point, as in store-service, or, as shown in this instance, to convey books from point to point as is desirable to facilitate the service in large libraries. The apparatus comprises a suitable track or way extending from one to the other of the points between which the articles are to be conveyed, and preferably in the form of an endless way, upon which the carriers travel continuously. One or more carriers are propelled along this way by an endless cord or cable, to which the carriers are permanently connected, and said carriers each have a receptacle for the article to be conveyed so connected with the portion of the carrier that is guided along the track that the said receptacle always hangs in substantially the same position with relation to horizontal and vertical lines no matter what may be the direction of movement of the carrier along the track. The said receptacle is open at the top and is constructed to coöperate with receptacles on vertical portions of the track in such manner that when the carrier moves downward past a receptacle the contents of the carrier are delivered therefrom into said receptacle, but when the carrier moves upward and past a receptacle it will itself take up the contents of the receptacle and convey them to the next delivering-point.

Figure 1:
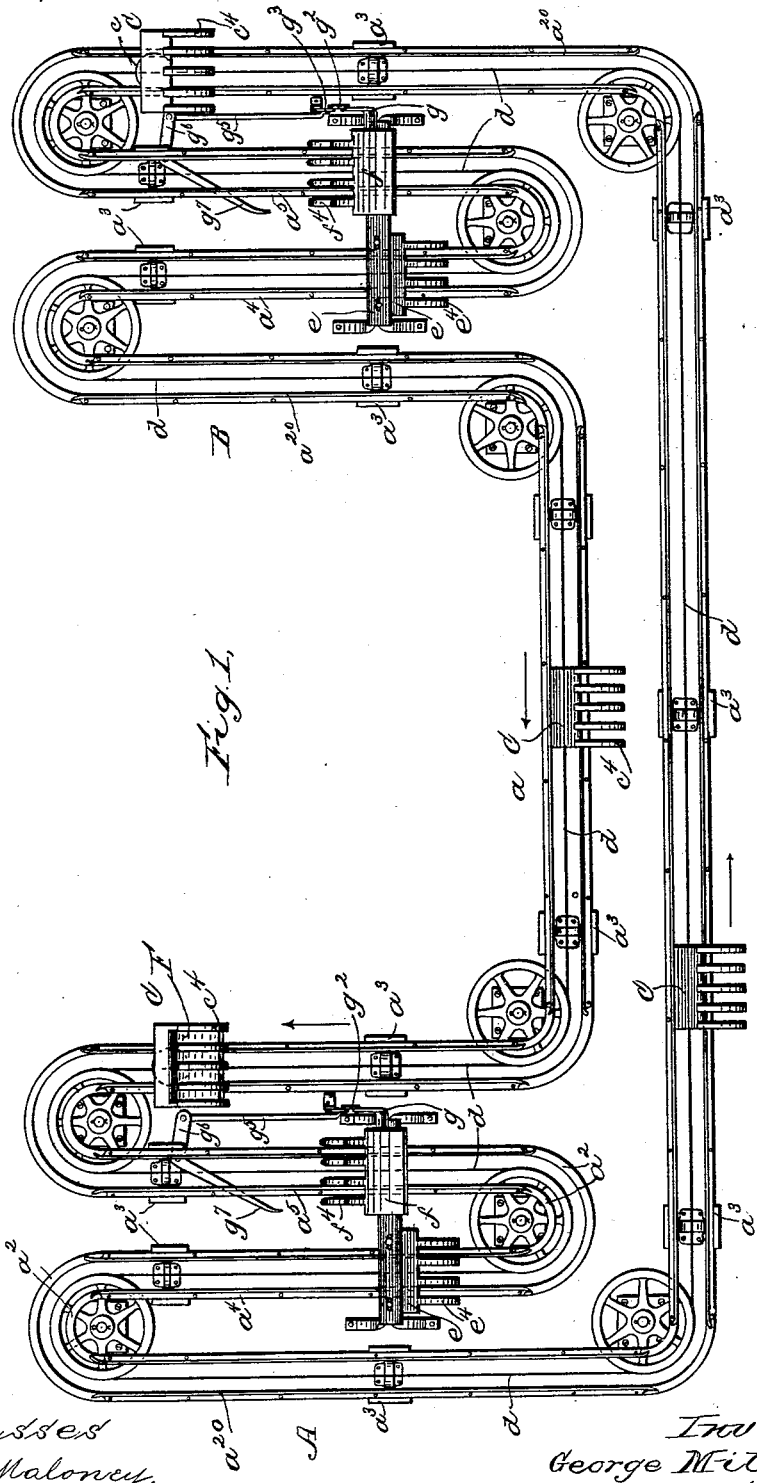
Figure 4:
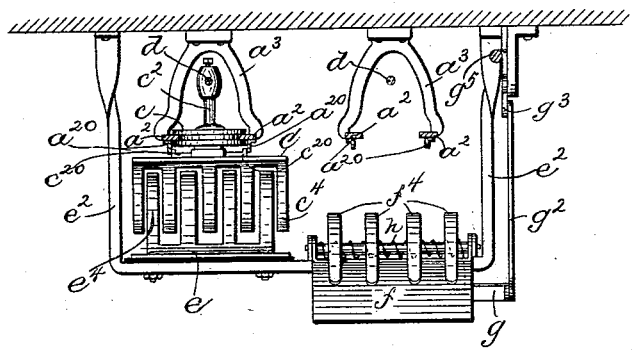
Figure 5:
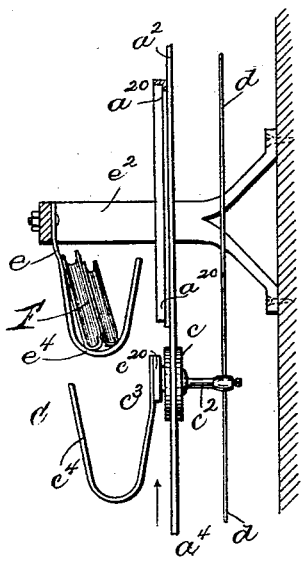

Figure 1 is a front elevation of a conveying apparatus embodying this invention; Fig. 2, a similar elevation, on a larger scale, of the appliances at a sending and receiving station; Fig. 3, a side elevation thereof; Fig. 4, a sectional plan; Fig. 5, a vertical sectional detail illustrating the operation of the carrier in taking up articles to be conveyed from the sending-point, and Fig. 6 a similar sectional view illustrating the operation of delivering the articles from the carrier at a receiving point or station.

As shown in Fig. 1, the conveying apparatus comprises a track connecting two stations A and B, each of which stations contains sending and receiving appliances, so that articles may be sent from either station and received at the other. The said apparatus comprises a track or guideway $a$, extending from one to the other of the stations A B and back again in the form of a continuous endless track or loop. The said track is shown in this instance as consisting of parallel rods or strips $a^2$, supported from point to point by suitable brackets $a^3$, as shown in the larger detail figures, especially Fig. 4, the said rails sustaining and guiding the carriers C, of which there may be any desired number, each having a grooved wheel or pulley $c$, which runs along the track-rails $a^2$ and is guided thereby, the axis of said pulley being connected by a rod or stem $c^2$ (see Figs. 4 and 5) with the propelling-cord $d$, which runs over suitable pulleys at the various angles in the track $a$ and propels the several carriers C along said track.

Figure 6:
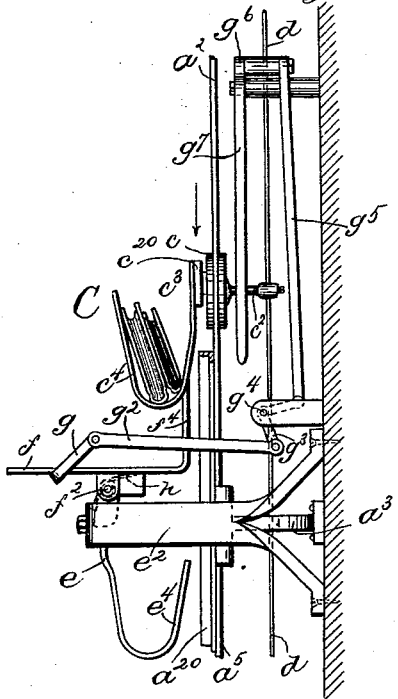

Connected with the running portion of the carrier by a swivel-joint is a pendent receptacle $c^3$ for the article to be carried, said receptacle being in the form of a trough or channel open at the top and having the bottom portion composed of a number of curved or U-shaped fingers $c^4$, constituting a supporting portion upon which the article rests, there being spaces between the said fingers for the purpose to be explained. The receptacle and material carried by it, as shown in Fig. 6, hangs below the swivel connection with the running portion of the carrier and thus retains its substantially horizontal position by the force of gravity no matter what may be the direction of the track along which the carrier is traveling.

At points where the articles are to be applied to or removed from the carriers the track is substantially vertical and so arranged with relation to the continuous movement of the carriers that the latter move upward on the vertical portions $a^4$, where the article is to be applied to the carrier, and move downward on the vertical portions $a^5$, where the articles are to be removed from the carrier, two such vertical portions connected by a curve at the lower end, in conjunction with the accompanying appliances, thus constituting a sending and receiving station, as best shown in Fig. 2.

At the delivering and receiving points receptacles coöperating with the receptacles $c^3$ of the carriers are supported in such relation to the track that the fingers or projections $c^4$ of the carrier pass between similar fingers or projections of the receptacles supported near the track. On the portions $a^4$ of the track where the carriers are to receive the parcels or articles to be conveyed the coöperating station-receptacle may be constructed as shown in Figs. 2 and 5, it consisting of a receptacle $e$, similar to the receptacle $c^3$ of the carrier, but supported upon a stationary frame or bracket $e^2$ at the front of the track $a^4$, with the projections $e^4$, constituting the supporting portions of the receptacle, extending inward toward the track, while the projections $c^4$ of the carrier extend outward from the track.

The fingers or projections $e^4$ of the stationary receptacle are so arranged as to be in line with the spaces between the fingers $c^4$ of the carriers as they pass in their upward movement along the track $a^4$, and it will be seen by reference to Fig. 5 that any article, as F, placed in a stationary receptacle $e$, and resting upon the fingers thereof, and thus lying across the spaces between the said fingers, will be engaged by the fingers $c^4$ of the carrier-receptacle $c^3$ as the latter moves up, so that the said fingers $c^4$ pass through the spaces between the fingers $e^4$ of the stationary receptacle and thus lift the article F out from the receptacle $e$ and carry the same along as the carrier continues its movement along the track. After moving upwardly past a stationary receptacle, as $e^4$, and taking up the contents thereof the carrier continues along the track to the other station where it is to deliver the article thus taken by it, and at the delivery-point the carrier, as before stated, moves downward on the vertical portion $a^5$ of the track, so that a stationary receptacle, just like the one $e$ before described, might be employed to take the article from the carrier as the latter moves downward past the said receptacle. Preferably, however, at the points where the articles are to be delivered from the carriers the receptacle is made movable and operates to discharge the article from it immediately after it has received the said article from the carrier, so that said station receptacle or receiver is thus at all times ready to receive from the carriers without attention on the part of the operators. The said receiving-receptacle $f$ is pivotally supported at $f^2$ upon a stationary bracket or frame-piece, which may be the same bracket $e^2$ that supports the receptacle $e$ before described. The portion of the receptacle $f$ on the side of the pivot $f^2$ next to the track is composed of a series of bent or L-shaped fingers $f^4$, which are spaced to correspond with the spaces between the fingers $c^4$ of the carrier, and when the carrier is approaching the said receptacle the latter is turned to the position shown in Fig. 6, so that the said fingers $f^4$ act to engage the article as the carrier moves past, the said article thus being deposited upon the pivoted platform or receptacle $f$, and after the carrier passes the said platform turns on its pivot $f^2$ from the position shown in Fig. 6 to that shown in Fig. 3, so that the article slides off and may be discharged upon any suitable table, support, or platform to receive it.

In order to turn the receptacle from the position shown in Fig. 3 to that shown in Fig. 6 as the carrier approaches, the said receptacle is provided with an arm $g$, connected by a link $g^2$ with one arm of a bell-crank lever $g^3$, pivoted at $g^4$, having its other arm connected by a link $g^5$ with one arm $g^6$ of a bell-crank lever, the other arm $g^7$ of which normally stands in an inclined position across the path of some portion of the running-gear of the carrier, as herein shown that of the connector $c^2$ between the cord and carrier. Thus when the carrier comes along down toward the station, the portion $c^2$ engages the arm $g^7$ and crowds it over, thus raising the arm $g^6$ and, by means of the connecting appliances, turning the receptacle $f$ to the position shown in Fig. 6. A spring $h$ (see Fig. 4) tends to turn the receptacle from the position shown in Fig. 6 to that shown in Fig. 3, and thus to discharge the article received from the carrier immediately after the latter passes, and the weight of the article will usually be such that when deposited upon the receiver $f$ it will tend to turn the same toward the position shown in Fig. 3, so that only a comparatively small spring force is required.

It obviously is not essential that both sending and receiving appliances should be located at each point or station, as a line might be used for conveying articles in one direction only, for example, from the sending-track $a^4$ and receptacle $e$ at the station A to the receiving-track $a^5$ and receiver $f$ at the station B, (see Fig. 1;) but the apparatus shown is equally adapted to send in both directions, the carrier entering the station first passing a receiving and delivering receptacle, so that it delivers its contents, if there be any, and then subsequently passing the sending-receptacle, so as to take the contents therefrom, if there be any, and carry them to the remote station.

The receiving and delivering receptacles are adjacent to one another, so that both are within easy reach of the attendant at the station to which they pertain. It is necessary, therefore, for the operator merely to put the article to be sent into the sending-receptacle $e$, when the next carrier that comes along will automatically take said article, convey it to the other station, and automatically deliver it at that point, and will then be ready to similarly take any article that may be in the sending-receptacle at the second station and carry it to the point at which it is to be delivered.

In order to prevent oscillation of the carrier-receptacle, especially on the portions of the track where it passes station-receptacles, auxiliary guide-flanges $a^{20}$ are provided, which coöperate with guides $c^{20}$ on the carriage, as best shown in Fig. 4, and steady the carrier-receptacle against swinging movement on its swivel connection with the running portion. Similar auxiliary guides may be used upon the horizontal portions of the track, if desired, in which case the auxiliary guides will be absent at points where the track changes from horizontal to vertical direction in order that the carrier-receptacle may pass from one to the other portion at the angle without swinging movement.

I claim—

1. A conveying apparatus comprising a track and carrier movable thereon and a receptacle pivotally connected with said carrier and being pendent therefrom wholly at one side of the track, said receptacle having supporting portions and intermediate spaces, combined with a receptacle supported in proximity to the track having supporting portions and spaces arranged in the path of the spaces and supporting portions respectively of the carrier, whereby as the carrier-receptacle passes the stationary receptacle an article in one of said receptacles is transferred to the other, substantially as described.

2. The track, the carrier, and means for propelling said carrier along said track, the said track having vertical portions on which the carrier is adapted to be propelled in an upward direction, and the said carrier having a receptacle pivotally connected therewith and being pendent therefrom wholly at one side of the track, said receptacle having outwardly-projecting supporting-fingers, combined with a receptacle supported in proximity to said vertical portion of the track with inwardly-projecting supporting-fingers, corresponding in position to the spaces between the fingers of the carrier, whereby the said carrier as it moves upward past the stationary receptacle will remove an article supported in the latter, substantially as and for the purpose described.

3. The track, the carrier, and means for propelling said carrier along said track, the said track having a vertical portion on which the carrier is adapted to be propelled in a downward direction, and the said carrier having a receptacle pivotally connected therewith and being pendent therefrom wholly at one side of the track, said receptacle having outwardly-projecting supporting-fingers, combined with a receiver supported in proximity to said vertical portion of the track with inwardly-projecting supporting-fingers, corresponding in position to the spaces between the fingers of the carrier, whereby the contents of said carrier will be automatically delivered to said receiver, substantially as and for the purpose described.

4. The track, the carrier, and means for propelling the carrier along said track, and said carrier having a receptacle with supporting portions and intermediate spaces, combined with the receiver movably supported in proximity to the track, having supporting portions and intermediate spaces arranged to correspond to the spaces and supporting portions respectively of the carrier, and means controlled by the approaching carrier to move the said receiver into position to engage an article supported in said carrier-receptacle as the latter passes, and subsequently deliver said article from said receiver, substantially as and for the purpose described.

5. A conveying apparatus comprising a track and carrier movable thereon and having a pendent receptacle with outwardly-projecting supporting-fingers, said track having adjacent parallel vertical portions, combined with a receiving-receptacle and an adjacent delivery-receptacle supported in proximity to said vertical portions of the track and constituting therewith a receiving and delivery station, the said carrier on arriving at said vertical portions passing first downward over one portion and then upward over the other portion whereby the contents of a carrier-receptacle on arriving will be delivered therefrom, and the said carrier-receptacle on departing will take the contents of the delivery-receptacle past which it moves in the upward direction, substantially as and for the purpose described.

6. The track and carrier and means for propelling said carrier along said track, said carrier having a running portion engaged with said track and a pendent receptacle pivotally connected with said running portion combined with auxiliary guides on said track and the pendent portion of the carrier whereby the latter is restrained from oscillating movement with relation to the running portion and track, substantially as and for the purpose described.

7. The track and carrier and means for propelling the carrier along said track, said carrier having a receptacle for the material to be conveyed, combined with a receiver movably supported in proximity to the track and means controlled by the approaching carrier whereby the said receiver is automatically moved into position to receive the material from the passing carrier and means for automatically removing said receiver to deliver the material therefrom, substantially as described.

In testimony whereof I have signed my name to this specification in the presence of two subscribing witnesses.

GEORGE MILES.

Witnesses:
H. J. LIVERMORE,
JAS. J. MALONEY.